(12) United States Patent
Zarubinsky et al.

(10) Patent No.: US 11,082,135 B2
(45) Date of Patent: Aug. 3, 2021

(54) APPARATUS AND METHOD FOR PROCESSING A DIGITAL SIGNAL IN A FREQUENCY DOMAIN LINEAR EQUALIZER

(71) Applicant: Huawei Technologies Co., Ltd., Guangdong (CN)

(72) Inventors: Michael Zarubinsky, Munich (DE); Doron Cohen, Munich (DE); Qingsong Xue, Shenzhen (CN); Dori Gidron, Munich (DE); Ling Liu, Wuhan (CN); Changsong Xie, Munich (DE); Liangchuan Li, Dongguan (CN); Ming Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/230,891

(22) Filed: Dec. 21, 2018

(65) Prior Publication Data

US 2019/0123834 A1 Apr. 25, 2019

Related U.S. Application Data

(63) Continuation of application No. PCT/EP2016/064579, filed on Jun. 23, 2016.

(51) Int. Cl.
*H04B 10/69* (2013.01)
*H04L 25/03* (2006.01)
(Continued)

(52) U.S. Cl.
CPC ....... *H04B 10/6971* (2013.01); *H04B 7/0413* (2013.01); *H04L 25/03159* (2013.01); *H04L 27/2628* (2013.01); *H04B 2210/252* (2013.01)

(58) Field of Classification Search
CPC ............ H04B 10/6161; H04B 10/6162; H04B 10/6971; H04B 2210/252; H04L 27/2628; H04L 25/03159
See application file for complete search history.

(56) References Cited

U.S. PATENT DOCUMENTS 7,701,842 B2 4/2010 Roberts et al.
7,894,728 B1 2/2011 Sun et al.
(Continued)

FOREIGN PATENT DOCUMENTS

CN 1925473 A 3/2007
CN 101388872 A 3/2009
(Continued)

OTHER PUBLICATIONS

Fabio Pittala and Josef A. Nossek, Efficient Frequency-Domain Fractionally-Spaced Equalizer for Flexible Digital Coherent Optical Receivers, Huawei Technologies Dusseldorf GmbH, Technische Universitat Munchen, 2015 (Year: 2015).*

(Continued)

*Primary Examiner* — Aristocratis Fotakis

(57) ABSTRACT

The present disclosure relates to an apparatus and method of processing a digital signal, wherein an input signal is transformed into the frequency domain by applying a fast Fourier transformation (FFT) processing to obtain a transformed input signal. Positive and negative frequency components of the transformed input signal are separated and respective ones of the separated positive and negative frequency components are separately processed by respective digital filtering to obtain filtered frequency components. The filtered frequency components are combined in the frequency domain using a down-sampling operation for down-sampling the filtered frequency components from an input number of samples per symbol to a different output number (Continued)

of samples per symbol, and the combined output components are converted into the time domain by applying an IFFT processing.

14 Claims, 8 Drawing Sheets

(51) Int. Cl.
*H04B 7/0413* (2017.01)
*H04L 27/26* (2006.01)

(56) References Cited

U.S. PATENT DOCUMENTS

| | | | | |
|---|---|---|---|---|
| 8,923,460 | B1* | 12/2014 | Wang | H04B 10/6162 |
| | | | | 375/350 |
| 9,225,431 | B1* | 12/2015 | Arabaci | H04B 10/25133 |
| 10,110,319 | B1* | 10/2018 | Hueda | H04B 10/6162 |
| 2002/0093908 | A1* | 7/2002 | Yeap | H04Q 11/0421 |
| | | | | 370/201 |
| 2002/0106009 | A1* | 8/2002 | Harrison | H04J 4/005 |
| | | | | 375/219 |
| 2007/0053417 | A1 | 3/2007 | Nagata et al. | |
| 2009/0201796 | A1* | 8/2009 | Roberts | H04B 10/6162 |
| | | | | 370/210 |
| 2010/0092181 | A1* | 4/2010 | Roberts | H04B 10/6161 |
| | | | | 398/159 |
| 2010/0158078 | A1* | 6/2010 | Ro | H04B 1/7143 |
| | | | | 375/135 |
| 2011/0103795 | A1* | 5/2011 | Khandani | H04B 10/613 |
| | | | | 398/65 |
| 2013/0195459 | A1 | 8/2013 | Shieh | |
| 2013/0209089 | A1* | 8/2013 | Harley | H04B 10/5561 |
| | | | | 398/25 |
| 2015/0171972 | A1 | 6/2015 | Xie et al. | |
| 2015/0229409 | A1 | 8/2015 | Chen et al. | |
| 2015/0280853 | A1* | 10/2015 | Sun | H04B 10/6162 |
| | | | | 370/482 |
| 2016/0006530 | A1* | 1/2016 | Nazarathy | H04L 1/0071 |
| | | | | 398/76 |
| 2017/0012598 | A1* | 1/2017 | Harris | H03H 7/12 |
| 2017/0012704 | A1* | 1/2017 | Oveis Gharan | H04B 10/697 |
| 2018/0287712 | A1* | 10/2018 | Dar | H04J 14/06 |

FOREIGN PATENT DOCUMENTS

| | | |
|---|---|---|
| CN | 102859957 A | 1/2013 |
| CN | 104247306 A | 12/2014 |
| CN | 105684331 A | 6/2016 |

OTHER PUBLICATIONS

Ruben Andres Soriano et al., "Chromatic Dispersion Estimation in Digital Coherent Receivers", Journal of Lightwave Technology, vol. 29, No. 11, Jun. 1, 2011, p. 1627-1637, XP11323832.

Omid Zia-Chahabi et al., "Efficient Frequency-Domain Implementation of Block-LMS/CMA Fractionally Spaced Equalization for Coherent Optical Communications", IEEE Photonics Technology Letters, vol. 23, No. 22, Nov. 15, 2011. p. 1697-1699.

\* cited by examiner

APPARATUS AND METHOD FOR PROCESSING A DIGITAL SIGNAL IN A FREQUENCY DOMAIN LINEAR EQUALIZER

CROSS-REFERENCE TO RELATED APPLICATIONS

This application is a continuation of International Application No. PCT/EP2016/064579 filed on Jun. 23, 2016, the disclosure of which is hereby incorporated by reference in its entirety.

TECHNICAL FIELD

The present application relates to an apparatus and method for processing a digital signal in a frequency domain linear equalizer for coherent optical receivers.

BACKGROUND

An important goal of long-haul optical fiber systems is to transmit the high data throughput over a long distance without signal regeneration. Given constraints on the bandwidth imposed by optical amplifiers and ultimately by the fiber itself, it is important to maximize spectral efficiency. But given constraints on signal power imposed by fiber nonlinearity, it is also important to maximize power (or signal-to-noise ratio (SNR)) efficiency, i.e., to minimize the required average transmitted energy per bit (or the required SNR per bit). Most current systems use binary modulation formats, such as on-off keying or differential phase-shift keying, which encode one bit per symbol. Noncoherent detection and differentially coherent detection offer good power efficiency only at low spectral efficiency, because they limit the degrees of freedom available for encoding of information.

The most promising detection technique for achieving high spectral efficiency while maximizing power (or SNR) efficiency, is coherent detection with polarization multiplexing, as symbol decisions are made using the in-phase (I) and quadrature (Q) signals in the two field polarizations, allowing information to be encoded in all the available degrees of freedom. When the outputs of an optoelectronic downconverter are sampled at Nyquist rate, the digitized waveform retains full information of the electric field, which enables compensation of transmission impairments by digital signal processing (DSP). A DSP-based receiver may be advantageous because adaptive algorithms can be used to compensate time-varying transmission impairments. Advanced forward error-correction coding can also be implemented. Moreover, digitized signals can be delayed, split and amplified without degradation in signal quality. DSP-based receivers are ubiquitous in wireless and digital subscriber line (DSL) systems at lower data rates. Continued hardware improvements will enable deployment of DSP-based coherent optical systems in the next few years.

A key block of modern coherent optical receivers is a linear equalizer. The equalizer is typically implemented as an adaptive complex digital filter adapted to perform at least one of chromatic dispersion (CD) compensation, polarization demultiplexing (state of polarization (SOP) compensation), differential group delay (DGD) compensation, polarization mode dispersion (PMD) compensation and polarization dependent loss (PDL) compensation. Typically, the equalizer is implemented in two stages. The first stage is a fixed equalizer for CD compensation in Frequency Domain (FD). CD compensation is always done in FD because it requires very long impulse response of the fixed equalizer (thousands of filter taps for long haul systems). The second stage is an adaptive MIMO equalizer for polarization demultiplexing and SOP/PMD/PDL compensation in time domain (TD). Adaptation feedback loop should have small enough delay to provide fast tracking of SOP rotation. The TD implementation reduces the loop delay.

Another approach is based on a single-stage frequency domain equalizer, as disclosed for example in U.S. Pat. No. 7,701,842 B2. In this case both the fixed CD equalization and adaptive MIMO equalization are done in FD to reduce the complexity.

Adaptive filter coefficients are calculated using a block constant modulus algorithm (CMA) of least mean square (LMS) algorithms. For time domain block algorithms, the filter coefficients are derived as average of convolution of error and conjugate input signals. In FD, this operation is equivalent to multiplication of Fourier transforms of the corresponding signals. Due to cyclic property of the FD convolution, there are two types of the feedback processing, namely constrained processing and unconstrained processing. For constrained processing, the cyclic convolution problem is resolved by limiting the coefficient vector length in TD (e.g., a gradient constraint function). This type of processing provides good performance but requires additional inverse fast Fourier transformation (IFFT) and fast Fourier transformation (FFT) in the feedback loop. This leads to an increase in complexity and loop delay. For unconstrained processing, the gradient constraint function is not used to simplify implementation and reduce loop delay. The convolution remains cyclic. This may cause large penalty in performance.

The prior art of U.S. Pat. No. 7,701,842 B2 is based on the unconstrained processing. This allows reducing complexity but introduces enhanced performance penalty.

Disadvantages of the prior art are inability to track fast SOP rotation due to large delay in the feedback loop, high complexity and power consumption due to large FFTs and IFFTs, and insufficient flexibility to support different oversampling ratios of the input data. The loop delay depends on the size of the output IFFT and the feedback error of the FFT. In the prior art, these sizes are equal to the input FFT size. On the other hand, the input FFT size should be larger than the doubled CD value in time. For long-distance optical links, the CD value in time achieves thousands of sample periods. This requires very large input and feedback FFTs and output IFFTs. However, larger FFTs increase loop delay due to increased block sizes and pipeline depths. The prior art does not provide the required flexibility for cases where the input oversampling ratio is not constant. For example, some optical DSP should be able to work with low oversampling ratios (e.g. 1.25) or larger oversampling ratios (e.g. 2). Larger oversampling ratios are used for high performance cases, while lower oversampling ratios are targeted to reduce power consumption.

SUMMARY

It is an object of the present disclosure to provide an improved digital signal processing approach for an equalizer, by means of which the required flexibility can be provided for the cases when the input oversampling ratio is not constant.

The foregoing and other objects are achieved by the features of the independent claims. Further implementation forms are apparent from the dependent claims, the description and figures.

According to a first aspect there is provided an equalizing apparatus for processing a digital signal, said apparatus comprising: a fast Fourier transformer, FFT, for transforming an input signal into the frequency domain by applying an FFT processing to obtain a transformed input signal; a splitter for separating positive and negative frequency components of said transformed input signal; first and second parallel branches for separately processing respective ones of the separated positive and negative frequency components in respective digital filters to obtain filtered frequency components; a combiner for combining the filtered frequency components in the frequency domain using a down-sampling operation for down-sampling said filtered frequency components from an input number of samples per symbol to a different output number of samples per symbol; and an inverse fast Fourier transformer, IFFT, for converting the combined output components into the time domain by applying an IFFT processing. The above object is also solved in accordance with a second aspect.

According to the second aspect, there is provided an equalization method of processing a digital signal, the method comprising: transforming an input signal into the frequency domain by applying an FFT processing to obtain a transformed input signal; separating positive and negative frequency components of said transformed input signal; separately processing respective ones of the separated positive and negative frequency components by respective digital filtering to obtain filtered frequency components; combining the filtered frequency components in the frequency domain using a down-sampling operation for down-sampling said filtered frequency components from an input number of samples per symbol to a different output number of samples per symbol; and converting the combined output components into the time domain by applying an IFFT processing.

Accordingly, significant decrease of complexity can be achieved by enabling a reduction of the FFT size and a discarding of non-valuable frequency components, by allowing decimation in the feedback loop, and by using very simple triangle-shaped filters to frequency samples both for antialiasing, interpolation and constraining. The separation of positive and negative frequency components allows to discard a part of signal spectrum on the FFT output without losing any information. Moreover, reduction of area and power can be achieved without any noticeable performance degradation. As a further advantage, higher flexibility can be provided, since an input oversampling factor can be changed by altering the input FFT size only. The rest of processing flow can be kept unchanged.

It is noted that the transformers, splitter and combines according to the first aspect may be implemented based on discrete hardware circuitry with discrete hardware components, integrated chips, or arrangements of chip modules, or based on a signal processing device or chip controlled by a software routine or program stored in a memory, written on a computer-readable medium, or downloaded from a network, such as the internet. The steps of the method according to the second aspect can be implemented by a software routine or program stored in a memory, written on a computer-readable medium, or downloaded from a network, such as the internet.

According to a first implementation of the apparatus according to the first aspect, each of the digital filters may comprise at least one of a CD filter and a MIMO filter. This allows that CD and MIMO filtering is done in separate channels with less processing load.

According to a second implementation of the apparatus according to the first implementation of the first aspect, the CD filter and the MIMO filter may be arranged in series. This enables successive processing for CD and MIMO with different signal components.

According to a third implementation of the apparatus according to the second implementation of the first aspect, the CD filter may comprise one of a set of finite impulse response (FIR) filters for each frequency component. Thereby, one FIR filter can be used for each frequency components.

According to a fourth implementation of the apparatus according to the second or third implementations of the first aspect, an output of each of the at least one CD filter may be processed with a one-tap MIMO filter. Thereby, processing load can be reduced significantly.

According to a fifth implementation of the apparatus according to any one of the first to fourth implementation of the first aspect, output signals of the MIMO filter are supplied to the combiner. This allows using the combining as an equivalent to down-sampling.

According to a sixth implementation of the apparatus according to any preceding implementation of the first aspect or the first aspect as such, the FFT may have a variable data size. Thereby, flexible input processing can be provided.

According to a seventh implementation of the apparatus according to any preceding implementation of the first aspect or the first aspect as such, the IFFT may have a fixed data size smaller than the data size of the FFT. Thereby, the combined output signal can be converted to the time domain with a constant data size.

According to an eighth implementation of the apparatus according to any preceding implemen-tation of the first aspect or the first aspect as such, the positive and negative frequency components may be determined by the following positive and negative frequency components vectors:

$$X_{FFTA}(l)=X_{FFT}(l)$$

$$X_{FFTB}(l)=X_{FFT}(N-1-l),$$

wherein l=0, ..., L, and wherein L is determined as follows:

$$L=(1+r)\cdot M/2,$$

wherein r is the maximal roll-off factor of a Nyquist filter and M is the data size of said FFT. This allows to discard a part of the signal spectrum without loosing information.

According to a ninth implementation of the apparatus according to the eighth implementation, M may be determined by multiplying the data size of the FFT by the number of input samples per output symbol. Thereby, L can be made dependent on the variable data size of the FFT.

According to a tenth implementation of the apparatus according to any preceding implementation of the first aspect or the first aspect as such, the splitter may be adapted to discard a part of the signal spectrum of the FFT output signal. Thereby, less signal spectrum needs to be processed.

According to an eleventh implementation of the apparatus according to any preceding implementation of the first aspect or the first aspect as such, the combiner may comprise a decimator for decimating frequency samples. This allows reduction of feedback delay and complexity.

According to a twelfth implementation of the apparatus according to the eleventh implementation of the first aspect, the decimator may comprise a comb filter. Thereby, the decimation of frequency components can be achieved by a filter operation.

According to a thirteenth implementation of the apparatus according to the eleventh or twelfth implementation of the first aspect, the decimator may be adapted to perform poly-phase decimation with a dynamically selected decimation phase, and wherein different frequency domain samples may be used at different FFT cycles. This leads to an improved performance due to better use of frequency information.

According to a fourteenth implementation of the apparatus according to the eleventh to thirteenth implementation of the first aspect, the apparatus may further comprise an antialiasing filter adapted to process the filtered output components before decimation by the decimator. Thereby, performance can be further improved by providing a smoothing filter.

According to a fifteenth implementation of the apparatus according to the fourteenth implementation of the first aspect, the antialiasing filter may be adapted to provide a triangular-shaped impulse response. Thereby, smoothing can be optimized.

According to a sixteenth implementation of the apparatus according to the fourteenth or fifteenth implementation of the first aspect, the antialiasing filter may be adapted to provide a low-pass impulse response and to be applicable for frequency-domain samples. This allows simple implementation a smoothing filter.

According to a seventeenth implementation of the apparatus according to any preceding implementation of the first aspect, the apparatus may be adapted to update coefficients of the MIMO filter based on the result of multiplication of decimated conjugate output data of the CD filter by decimated error samples. Thus, the result of multiplication of decimated conjugate CD outputs and decimated error samples can be used for MIMO coefficients update.

According to an eighteenth implementation of the apparatus according to any preceding implementation of the first aspect or the first aspect as such, the apparatus may comprise a smoothing filter adapted to process said frequency components before MIMO update by said MIMO filter. This enables conversion of circular convolution of the CD output and the error to linear convolution.

According to a first implementation of the equalizing method according to the second aspect, the combining comprises decimating frequency samples. This allows reduction of feedback delay and complexity.

According to a second implementation of the equalizing method according to the first implementation of the second aspect, the decimating may be achieved by using a comb filter. Thereby, the decimation of frequency components can be achieved by a filter operation.

According to a third implementation of the equalizing method according to the first or second implementation of the second aspect, the decimating may comprise performing poly-phase decimation with a dynamically selected decimation phase, and using different frequency domain samples at different FFT cycles. This leads to an improved performance due to better use of frequency information.

According to a fourth implementation of the equalizing method according to the first to third implementation of the second aspect, the method may further comprise using an antialiasing filter for processing said filtered output components before said decimating. Thereby, performance can be further improved by providing a smoothing filter.

The above object is also solved in accordance with a third aspect.

According to the third aspect, an optical receiver device comprising an equalizing apparatus according to the first aspect is provided.

The above object is also solved in accordance with a fourth aspect.

According to the fourth aspect, a computer program comprising code means for producing the steps of the equalizing method of the second aspect when run on a computer device is provided.

Embodiments of the disclosure can be implemented in hardware or any combination of hardware and software.

It shall further be understood that a preferred embodiment of the disclosure can also be any combination of the dependent claims or above embodiments with the respective independent claim.

These and other aspects of the disclosure will be apparent and elucidated with reference to the embodiments described hereinafter.

BRIEF DESCRIPTION OF THE DRAWINGS

In the following detailed portion of the present disclosure, the disclosure will be explained in more detail with reference to an exemplary embodiment shown in the drawings, in which.

Identical reference signs are used for identical or at least functionally equivalent features.

DETAILED DESCRIPTION

In the following embodiments, frequency domain MIMO equalizers for coherent optical receivers are described.

In particular, the embodiments enable significant decrease of complexity by reducing FFT size and discarding non-valuable frequency components. Furthermore, decimation in the feedback loop can be implemented and a very simple triangle-shaped filter can be applied to frequency samples both for antialiasing, interpolation and constraining. Additionally, higher flexibility can be achieved. The input over-sampling factor can be changed by altering the input FFT size only. The rest of the processing flow can be kept unchanged.

Figure 1:
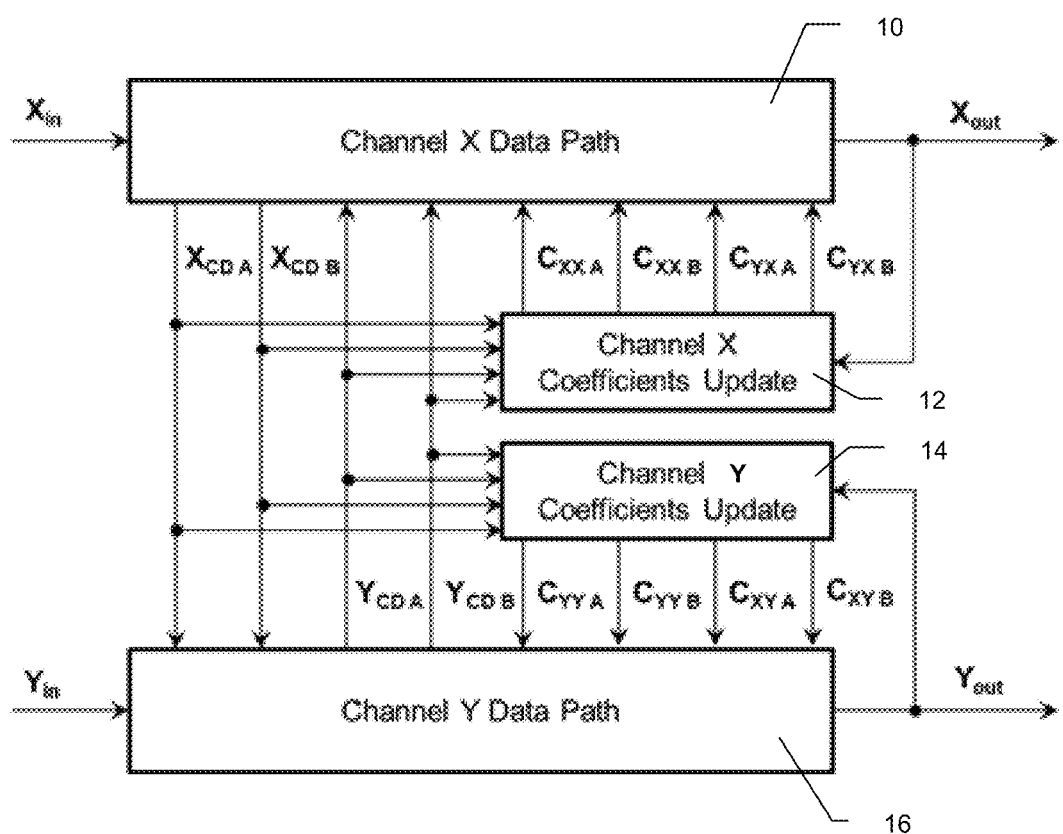
FIG. 1 shows a schematic block diagram of a linear equalizer according to the embodiment of the present disclosure.

FIG. 1 shows a schematic block diagram of a top-level block diagram of a linear equalizer with two separate channels X and Y according to a first embodiment. The equalizer comprises a channel X data path 10 with input data stream $X_{in}$ and output data stream $X_{out}$, and a channel Y data path 16 with input data stream $Y_{in}$ and output data stream $Y_{out}$. The channel X data path 10 supplies two output values $X_{CD\ A}$ and $X_{CD\ B}$ of respective internal CD filters to the channel Y data path 16. Similarly, the channel Y data path 16 supplies two output values $Y_{CD\ A}$ and $Y_{CD\ B}$ of respective internal CD filters to the channel X data path 10. These output values are input into respective internal MIMO filters provided in each of the data paths 10 and 16.

Additionally, the respective CD filter output values $X_{CD\ A}$, $X_{CD\ B}$, $Y_{CD\ A}$ and $Y_{CD\ B}$ are supplied to each of a channel X coefficient update unit 12 and a channel Y coefficient update unit 14 together with the respective output data stream $X_{out}$ and $Y_{out}$ of the controlled data path 10, 16, wherein the channel X coefficient update unit 12 and the channel Y coefficient update unit 14 are adapted to update and output coefficients $C_{XX\ A}$, $C_{XX\ B}$, $C_{YX\ A}$, $C_{YX\ B}$ for the respective internal MIMO filters of the channel X data path 10 and coefficients $C_{YY\ A}$, $C_{YY\ B}$, $C_{XY\ A}$, $C_{XY\ B}$ for the respective internal MIMO filters of the channel Y data path 16, respectively. Thus, channel coefficients of MIMO filters provided in each of the two data paths 10, 16 are updated based on their CD filter outputs.

Figure 2:
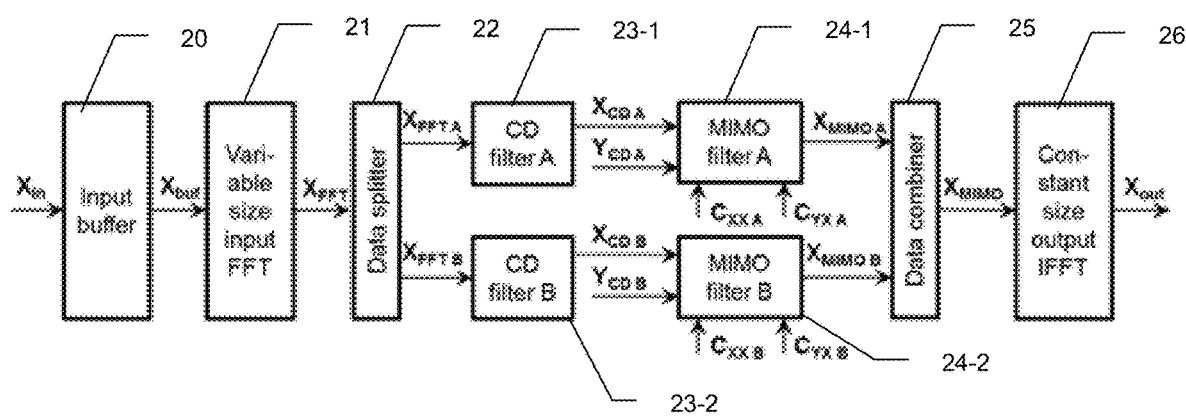
FIG. 2 shows a schematic block diagram of one of the two data channels of the linear equalizer according to the embodiment.

FIG. 2 shows a schematic block diagram for one (channel X) of two data paths 10 and 16 shown in FIG. 1. The channel Y data path 16 has the same structure.

According to FIG. 2, the input data stream $X_{in}$ in the TD of the channel X data path 10 is supplied to an input buffer 20 and the output stream $X_{buf}$ is supplied to a subsequent variable size input FFT 21 which outputs fast Fourier transformed data stream $X_{FFT}$ in the FD which is supplied to a data splitter 22. The data splitter splits the FD data stream $X_{FFT}$ into two FD data streams $X_{FFT\ A}$ and $X_{FFT\ B}$ of different frequency ranges A and B, which are supplied to a first respective CD filter A 23-1 and a second respective Cd filter B 23-2. The CD filtered separate output streams $X_{CD\ A}$ and $X_{CD\ B}$ of the CD filters A and B 23-1, 23-2 of the channel X data path 10 are supplied to respective MIMO filters A and B 24-1, 24-2 together with respective CD filtered separate output streams $Y_{CD\ A}$ and $Y_{CD\ B}$ of the channel Y data path 16. Furthermore, the MIMO filters A and B 24-1, 24-2 are controlled by the supplied filter coefficients $C_{XX\ A}$, $C_{XX\ B}$, $C_{YX\ A}$, $C_{YX\ B}$, respectively. Then, respective output data streams $X_{MIMO\ A}$ and $X_{MIMO\ B}$ of the MIMO filters A and B 24-2, 24-2 are supplied to a data combiner 25, where they are combined into a single data stream $X_{MIMO}$ and supplied to a final constant size output IFFT 26 so as to be converted into the TD output data stream $X_{out}$ shown in FIG. 1.

Figure 3:
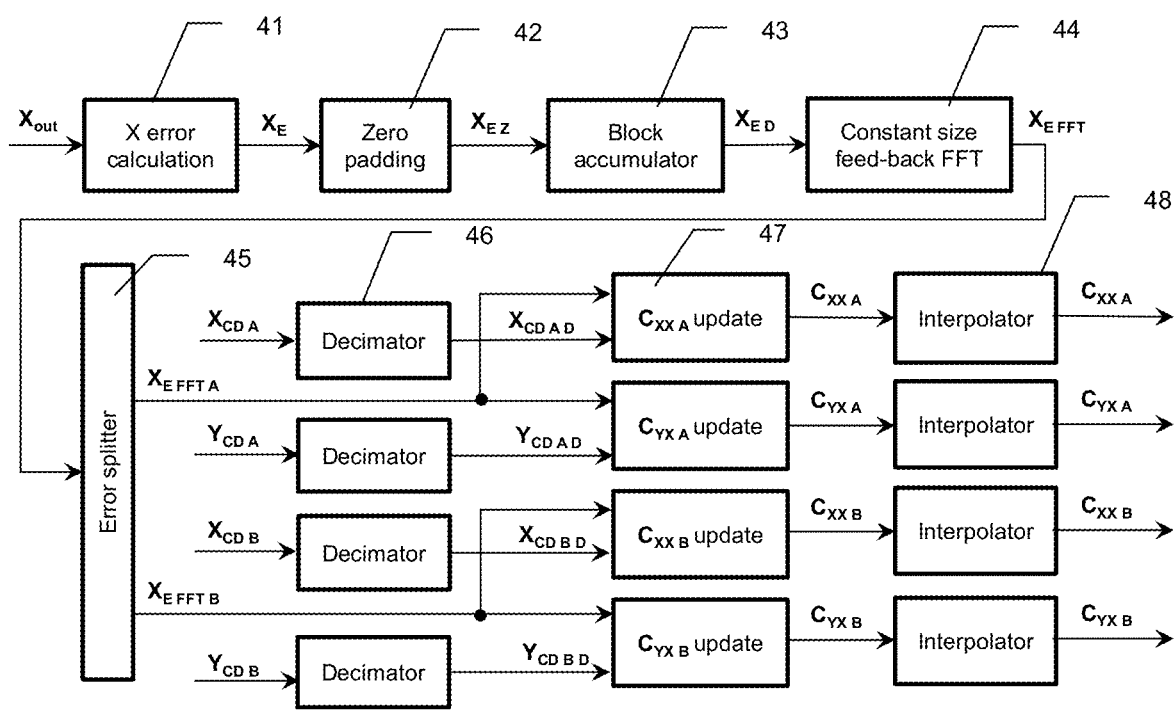
FIG. 3 shows a schematic block diagram of one of the two control channels of the linear equalizer according to the embodiment.

FIG. 3 shows a schematic block diagram for one (channel X) of two control channels of the coefficients update units 12, 14 shown in FIG. 1. Again, the second channel (Y) has the same structure.

The output data stream $X_{out}$ of the channel X data path 10 is first processed in an X error calculation unit 41 to obtain an error value stream $X_E$ which is subjected to zero padding in a zero padding unit 42 to obtain a zero-padded error stream $X_{E\ Z}$ which is then supplied to a block accumator unit 43. The block-accumulated error value stream $X_{E\ D}$ is then supplied to a feedback FFT 44 with constant size to obtain an FFT-converted FD error value stream $X_{E\ FFT}$ which is forwarded to an error splitter 45 adapted to split the FD error value stream $X_{E\ FFT}$ into the two different frequency ranges A and B of the data paths 10, 16 to obtain respective FD error value streams $X_{E\ FFT\ A}$ and $X_{E\ FFT\ B}$ which are supplied to respective coefficient update units 47 to control the update process.

Furthermore, the output values $X_{CD\ A}$, $X_{CD\ B}$, $Y_{CD\ A}$ and $Y_{CD\ B}$ of the respective CD filters of the channels X and Y of the data paths 10 and 16 are supplied to respective decimators 46 before being supplied as decimated output values $X_{CD\ A\ D}$, $X_{CD\ B\ D}$, $Y_{CD\ A\ D}$ and $Y_{CD\ B\ D}$ to the coefficient update units 47 of each of the MIMO filter coefficients $C_{XX\ A}$, $C_{XX\ B}$, $C_{YX\ A}$, $C_{YX\ B}$, respectively. Finally, the updated filter coefficients $C_{XX\ A}$, $C_{XX\ B}$, $C_{YX\ A}$ and $C_{YX\ B}$ are interpolated in respective interpolators 48.

Figure 4:
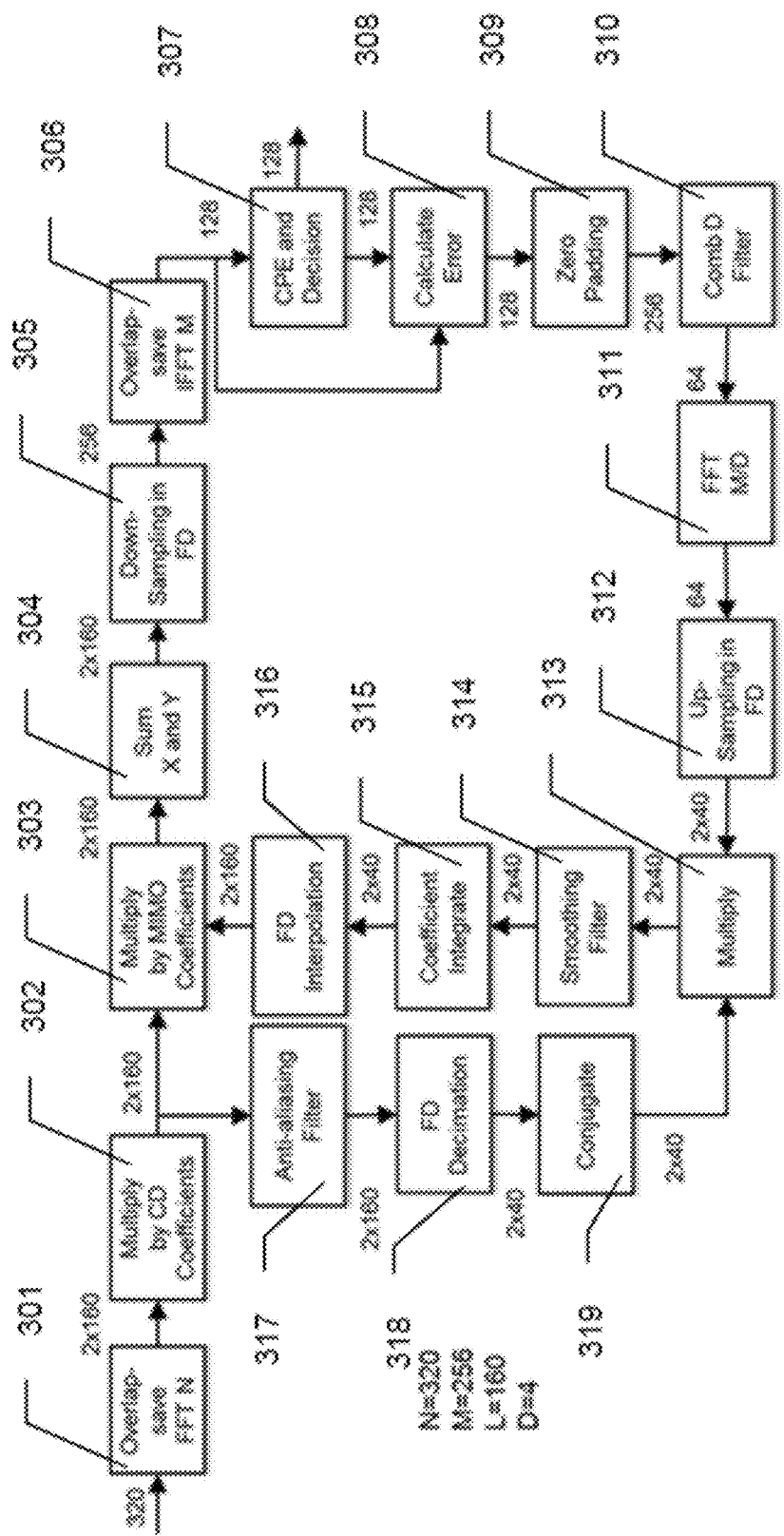
FIG. 4 shows a flow diagram of the equalization processing according to the embodiment.

FIG. 4 shows a schematic flow diagram of the data processing applied in the data channels X and Y of the data paths 10 and 16 and the control channels of the coefficient update units 12 and 14 of FIG. 1.

The input buffer 20 of FIG. 2 is used for overlap-and-save FFT function 301 and for synchronization of an input data rate and an internal data rate. The buffer output is derived from the input as follows:

$$X_{buf}(m)=X_{in}(i\ \mathrm{mod}\ M/2),$$

$$X_{buf}(m+M/2)=X_{in}(i\ \mathrm{mod}\ M/2+M/2),$$

where M is the input FFT size;

$$m = 0, \ldots , \frac{M}{2} - 1, i = 0, 1, \ldots$$

The input FFT function 301 has variable size M=SpS·N, where SpS is a number of input samples per output symbol; N is the constant size of the output IFFT function 306. The data splitter separates positive and negative frequency components after the FFT. The positive and negative frequency component vectors:

$$X_{FFT\ A}(l)=X_{FFT}(l),$$

$$X_{FFT\ B}(l+1)=X_{FFT}(N-1-l), l=0, \ldots ,L$$

The L value is constant and does not depend on the number of input samples per symbol SpS. It is calculated as $$L = (1 + r) \cdot \frac{M}{2}$$

where r is the maximal rolloff factor of the Nyquist filter.

Figure 5:
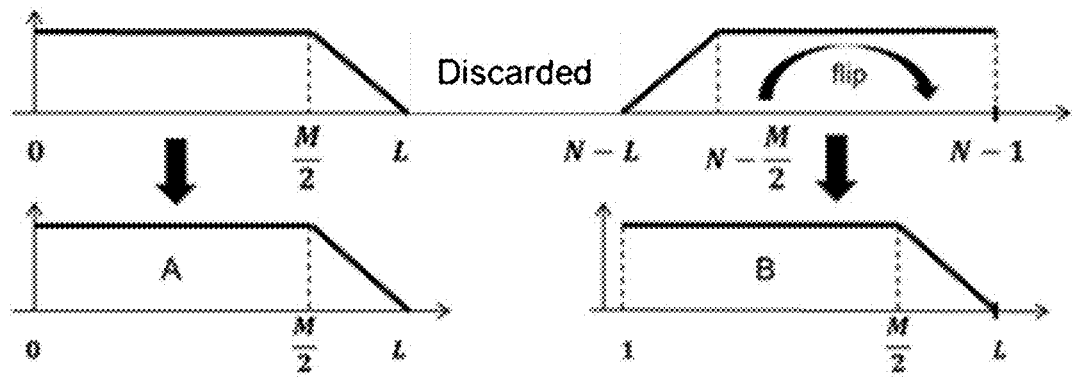
FIG. 5 shows a diagram for explaining separation of positive and negative frequency components.

FIG. 5 shows frequency diagrams for explaining the separation of positive and negative frequency components, which allows to discard a part (between L and N-L) of the signal spectrum on the FFT output without losing any information.

Both A and B parts of the FFT output are processed separately. Firstly, one of a set of N multi-tap CD FIR filters 302 is applied to each frequency component. Each filter output is a convolution with the filter coefficients. For part A:

$$X_{CD\ A}(l)=X_{FFT\ A}(l)*C_{CD\ A}(l),$$

$$X_{CD\ B}(l)=X_{FFT\ B}(l)*C_{CD\ B}(l),$$

where l=0, . . . , L−1 for A and l=1, . . . , L−1 for B; $C_{CD\ A}$ (l) and $C_{CD\ B}$ (l) are CD filter coefficients for the FFT bin number l.

Despite the total length of each filter is K taps, most of the tap coefficients are zero. Practically only one or two of the tap coefficients for each filter are not zero. Therefore, the complexity of the set of CD filters is low.

Use of the FFT of the size N and the set of CD filters of the length of K taps each is equivalent to use of one FFT of the size P=N·K. For example, N=160, K=16, P=2560. So, while the FFT size N is small, a maximal covered CD value corresponds to a much larger effective FFT size P.

Each CD filter output is processed with a one-tap MIMO filter function 303 as follows:

$$X_{MIMO\_A}(l)=C_{XX\_A}(l) \cdot X_{CD\_A}(l) C_{YX\_A}(l) \cdot Y_{CD\_A}(l),$$

$$X_{MIMO\_B}(l)=C_{XX\_B}(l) \cdot X_{CD\_B}(l) C_{YX\_B}(l) \cdot Y_{CD\_B}(l),$$

where $C_{XX\_A}(l)$, $C_{YX\_A}(l)$, $C_{XX\_B}(l)$, $C_{YX\_B}(l)$ are the MIMO filter coefficients for index l=0, . . . , L.

Figure 6:
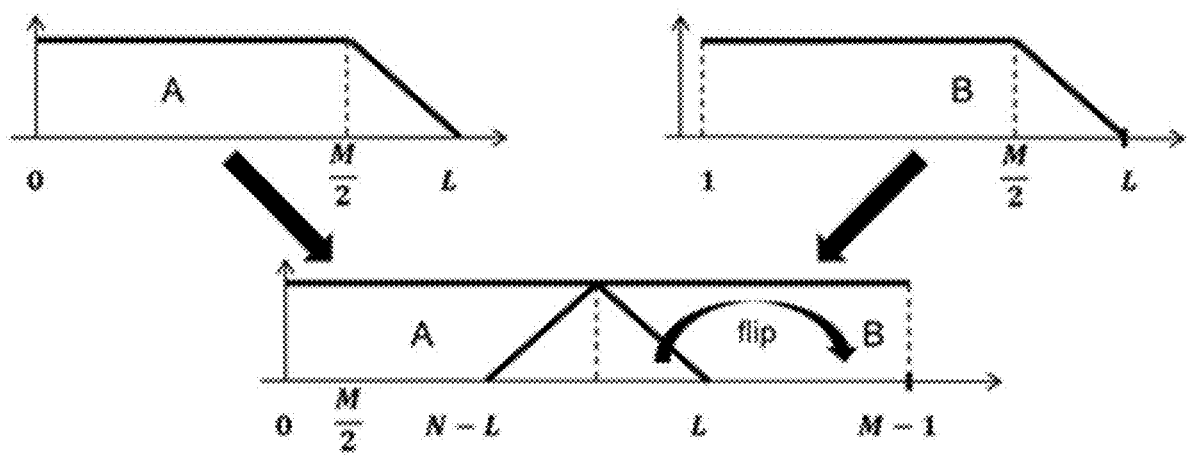
FIG. 6 shows a diagram for explaining down-sampling in the frequency domain.

FIG. 6 shows frequency diagram for explaining down-sampling in the frequency domain.

The outputs of A and B MIMO parts are combined (summing function 304) at the input of the output IFFT function 306 as follows:

$$X_{MIMO}(m) = \begin{cases} X_{MIMO\_A}(m), & 0 \le m < M - L, \\ X_{MIMO\_A}(m) + X_{MIMO\_B}(M - m), & M - L \le m \le L, \\ X_{MIMO\_B}(M - m), & L < m < M. \end{cases}$$

This combining is equivalent to down-sampling function 305 from input number of samples per symbol (SpS) to one sample per symbol.

The down-sampled signal is converted to TD with the output IFFT function 306 of the constant size M. If the overlap-save method is implemented, only M/2 middle output samples are used and the rest of the outputs are discarded by a decision function 307.

Figure 7:
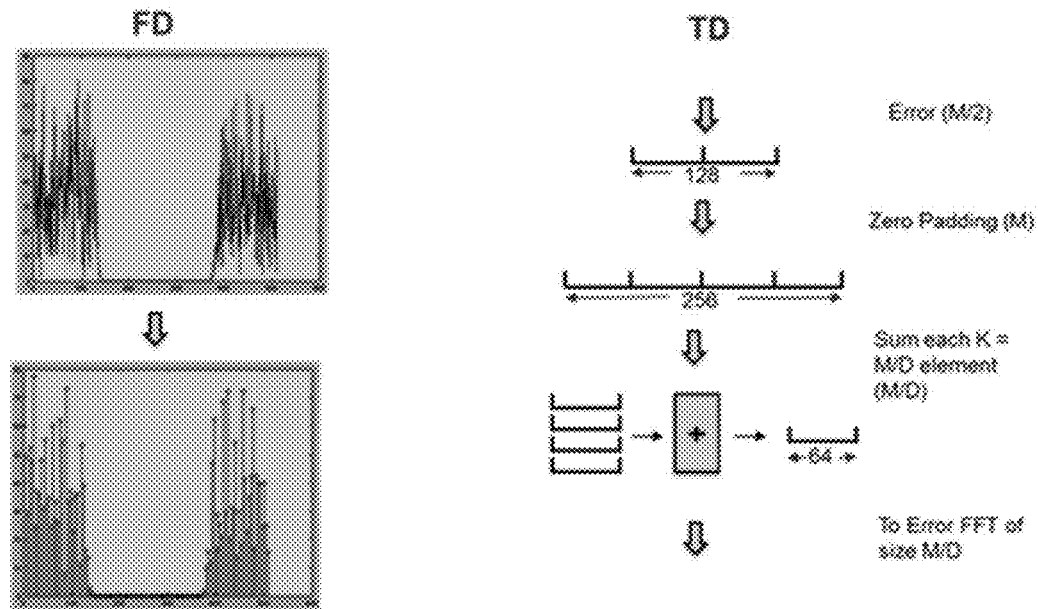
FIG. 7 shows a diagram for explaining the function of a comb filter in the time domain.

FIG. 7 shows a diagram for explaining a decimation by a comb filter in the TD (right-hand portion) in comparison to the FD (left-hand portion).

Error calculation in function 308 can be done with CMA, LMS or other similar method. The error signal vector $x_E$ (the vector length is M/2) is padded by M/2 zeroes (M/4 zeroes on each side) in zero padding function 309. As shown in FIG. 7 (right-hand portion), the number of samples and thus the time period in the TD is thereby increased.

In order to reduce feedback delay and complexity, decimation of frequency samples is done by a decimation function 310 (e.g. a comb filter). The corresponding operation in time domain is $$x_{ED}(i) = \sum_{d=0}^{D-1} x_{EZ}\left(i + d \cdot \frac{M}{D}\right), i = 0, \dots, \frac{M}{D} - 1$$

The decimation is based on the fact that adjusted frequency samples are correlated.

Another option for the decimation is poly-phase decimation when a decimation phase is selected dynamically.

Figure 8:
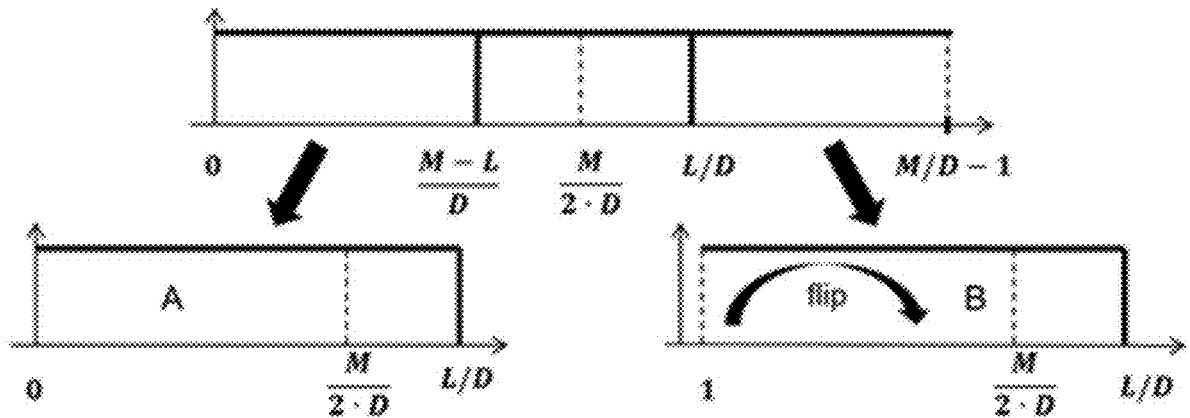
FIG. 8 shows a diagram for explaining up-sampling in the frequency domain.

FIG. 8 shows a diagram for explaining up-sampling in the frequency domain. The up-sampling has overlap as shown in FIG. 8.

In this case, at each FFT cycle c different frequency domain samples are used. In the time-domain the operation performed for the poly-phase method:

$$x_{ED}(i, c) = \sum_{d=0}^{D-1} e^{-j 2 \pi c \frac{i}{M}} \cdot x_{EZ}\left(i + d \cdot \frac{M}{D}, c\right)$$

where c=0, . . . , M/D−1 is the number of the FFT cycle.

Poly-phase decimation allows improving performance because of better use of frequency information but a bit increases the complexity.

The error FFT function 311 of a size of M/D converts the zero padded and decimated error signal $x_{E\_D}$ to the FD. The feedback FFT size is reduced by a factor of D.

The error splitter performs up-sampling in FD in an upsampling function 312, as follows:

$$X_{E\_FFT\_A}(l)X_{E\_FFT}(l),$$

$$X_{E\_FFT\_B}(l+1)=X_{E\_FFT}(M/D-1-l)$$

where l=0, . . . , L/D.

Both A and B parts are multiplied in a multiplying function 313 by the corresponding conjugate CD compensation outputs obtained by conjugation function 319. The CD compensation outputs used for calculation of MIMO coefficients are also decimated in a decimation function 318 as follows:

$$X_{CD\_A\_D}(k)=X_{CD\_A}(k*D),$$

$$X_{CD\_B\_D}(k)=X_{CD\_B}(k*D),$$

where k=0, . . . , M/D−1.

Before the decimation, an optional antialiasing filter 317 can be used. The filter is applied to frequency-domain samples and has a low pass response. The antialiasing filter 317 improves the performance. For example, if D=4, the antialiasing filter 317 can have triangle impulse response as follows:

$$C_{aa}=[1,2,1].$$

For poly-phase decimation when a decimation phase is selected dynamically, at the cycle c the frequency samples after decimation are obtained as follows:

$$X_{CD\_A\_D}(k)=X_{CD\_A}(k*D+C),$$

$$X_{CD\_B\_D}(k)=X_{CD\_B}(k*D+c),$$

where c=0, . . . , M/D−1 is the number of the FFT cycle.

Figure 9:
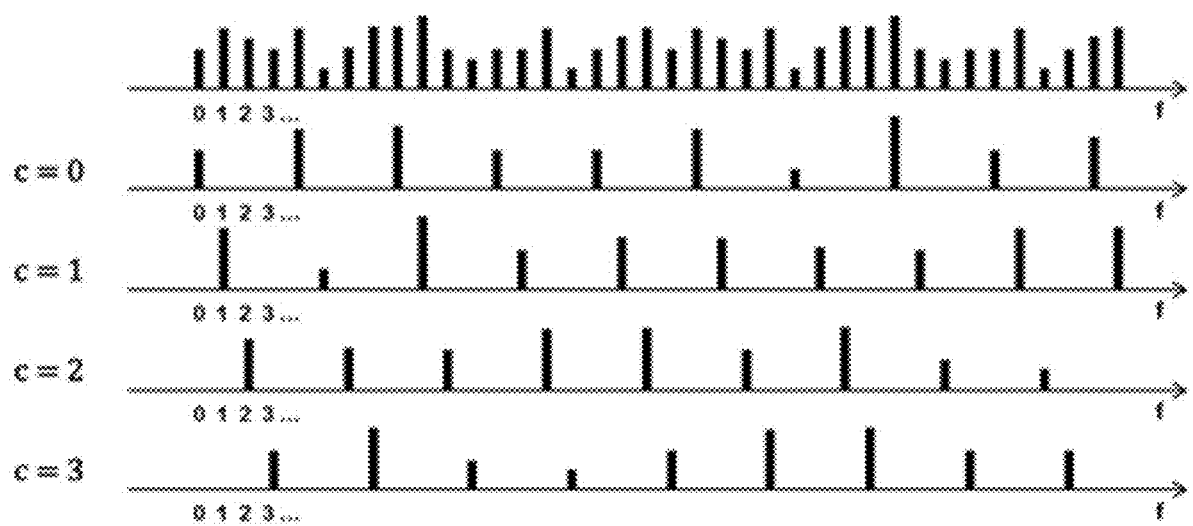
FIG. 9 shows a plurality of frequency diagrams for explaining an example of poly-phase decimation.

FIG. 9 shows a plurality of frequency diagrams for explaining an example of poly-phase decimation.

Poly-phase decimation for D=4, i.e., c=0, 1, 2 and 3.

The result of multiplication of decimated conjugate CD outputs and decimated error samples in the multiplication function 313 is used for MIMO coefficients update. Firstly, it is smoothed by a smoothing filter 314 applied to frequency samples. Use of the smoothing filter 314 is required to convert circular convolution of the CD output and the error to linear convolution. It is equivalent to a conventional constrained coefficient update method but requires much less complexity.

For example, the smoothing filter 314 can have very simple triangle shaped coefficients as follows:

$$C_{smooth}=[0,1,2,3,4,5,6,7,6,5,4,3,2,1,0].$$

Figure 10:
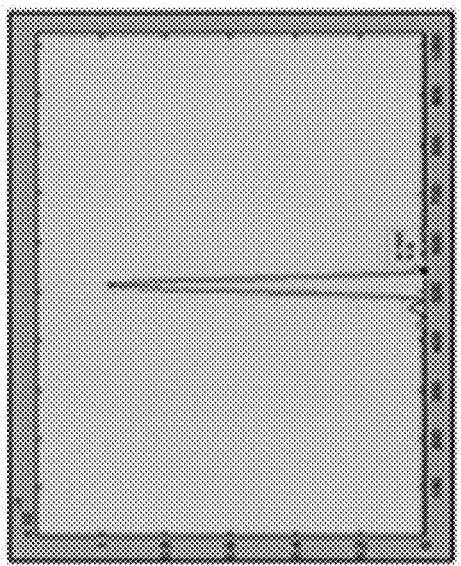
FIG. 10 shows time and frequency diagrams for comparison of constrained and smoothing filter methods.
Figure 10:
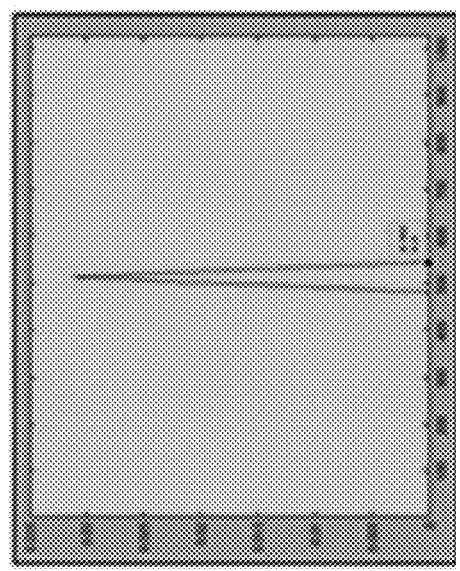
Figure 10:
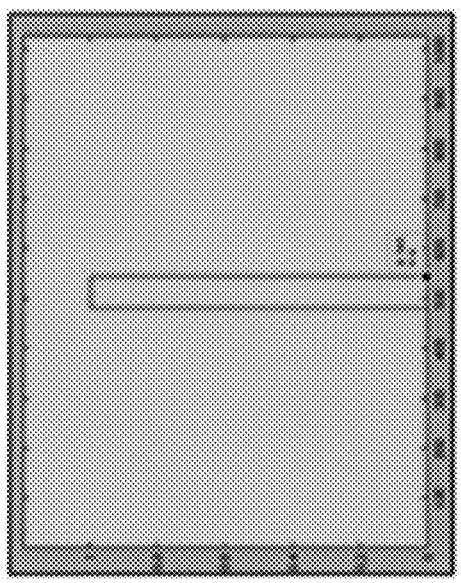
Figure 10:
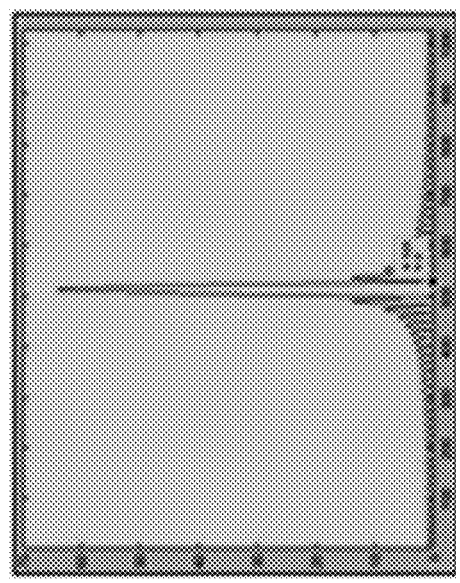

FIG. 10 shows TD and FD diagrams for comparison between the constrained method and the smoothing filter method. In the constrained method, steep TD signals require broader FD ranges, while in the smoothing filter method, moderate TD signals require smaller FD bandwidth.

The M/D output results of the smoothing filter are multiplied by an LMS step size and integrated separately in a coefficient integration function 315 as required for LMS algorithm. The results of coefficient update are interpolated back by a factor of D in an interpolation function 316. The interpolation can be done by a very simple linear interpolator which introduces a very small loop delay. For example, if D=4, the interpolation can be done by insertion three zeros between every neighboring coefficients and filtering the result with a linear interpolation filter having the following coefficients:

$C_{int}=[0,1,2,3,4,3,2,1,0]$.

To summarize, the present disclosure relates to an equalizing apparatus and method for processing a digital signal, wherein an input signal is transformed into the frequency domain by applying a fast Fourier transformation (FFT) processing to obtain a transformed input signal. Positive and negative frequency components of the transformed input signal are separated and respective ones of the separated positive and negative frequency components are separately processed by respective digital filtering to obtain filtered frequency components. The filtered frequency components are combined in the frequency domain using a down-sampling operation for down-sampling the filtered frequency components from an input number of samples per symbol to a different output number of samples per symbol, and the combined output components are converted into the time domain by applying an IFFT processing.

A multi-tap CD FIR filter can be applied to each frequency bin at the output of the input FFT. Most of the filter taps are zero. Only 1-2 taps are not zero. The sizes of the input FFT, output IFFT and the feedback error FFT may be reduced by a factor equal to the length of the multi-tap CD FIR filter. The input FFT has a variable size. The size of the input FFT may depend on an oversampling factor of the input signal. The output IFFT may have a constant size. The ratio between the input FFT size and the output IFFT size may be equal to the oversampling factor of the input signal. The output of the input FFT can be split into two parts (vectors) corresponding to positive and negative frequencies. The following processing is then done separately for both parts. The parts are combined before the output IFFT to provide down-sampling. Non-valuable high-frequency signal components are discarded. Frequency samples of the CD output used for MIMO coefficients calculation are decimated. An antialiasing filter may be applied to the frequency samples before the decimation. A block accumulation operation may be done in the error feedback path in TD. Polyphase decimation can be optionally used. A smoothing filter may be applied to the frequency samples derived after multiplication of CD output and error output. The smoothing filter converts circular convolution to linear one. The calculated MIMO coefficients can be interpolated by a simple filter in frequency domain.

While the disclosure has been illustrated and described in detail in the drawings and the foregoing description, such illustration and description are to be considered illustrative or exemplary and not restrictive. The disclosure is not limited to the disclosed embodiment. From reading the present disclosure, other modifications will be apparent to a person skilled in the art. Such modifications may involve other features which are already known in the art and which may be used instead of or in addition to features already described herein. Rather, the present disclosure can be applied to any receiver device with an equalizing functionality. The equalizer of the proposed system can be implemented in discrete hardware or based on software routines for controlling signal processors at the reception side.

The disclosure has been described in conjunction with various embodiments herein. However, other variations to the disclosed embodiments can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

Although the present disclosure has been described with reference to specific features and embodiments thereof, it is evident that various modifications and combinations can be made thereto without departing from the spirit and scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. An equalizing apparatus for processing a digital signal, the apparatus comprising:
    a fast Fourier transformer (FFT) configured to transform an input signal into the frequency domain by FFT processing to obtain a transformed input signal;
    a splitter configured to discard a part of the transformed input signal and separate positive and negative frequency components of a remaining transformed input signal;
    first and second parallel branches configured to separately process respective ones of the separated positive and negative frequency components in respective digital filters to obtain filtered frequency components, wherein each of the digital filters comprise at least one of a chromatic dispersion (CD) filter and a multiple-input multiple output (MIMO) filter, and the apparatus is configured to update coefficients of the MIMO filter based on the result of multiplication of decimated conjugate output data of the CD filter by decimated error samples;
    a combiner configured to combine the filtered frequency components in the frequency domain using a down-sampling operation for down-sampling the filtered frequency components from an input number of samples per symbol to a different output number of samples per symbol; and
    an inverse fast Fourier transformer (IFFT) configured to convert the combined output components into the time domain by IFFT processing,
    wherein the positive and negative frequency components are determined by the following positive and negative frequency components vectors;

$XFFTA(l)=XFFT(l)$ $XFFTB(l+1)=XFFT(N-1-l)$ wherein l=0, . . . , L, and wherein L is determined as follows:

$L=(1+r)\cdot M/2$, wherein r is the maximal roll-off factor of a Nyquist filter and M is the data size of the IFFT.

2. The apparatus according to claim 1, wherein the CD filter and the MIMO filter are arranged in series.

3. The apparatus of claim 2, wherein the CD filter comprises one of a set of finite impulse response (FIR) filters for each frequency component.

4. The apparatus of claim 2, wherein an output of each of the at least one CD filter is processed with a one-tap MIMO filter.

5. The apparatus of claim 1, wherein output signals of the MIMO filter are supplied to the combiner.

6. The apparatus of claim 1, wherein M is determined by multiplying the data size of the FFT by the number of input samples per output symbol.

7. The apparatus of claim 1, wherein the combiner comprises a decimator configured to decimate frequency samples.

8. The apparatus according to claim 7, further comprising:
an antialiasing filter configured to process the filtered output components before decimation by the decimator.

9. An equalizing method for processing a digital signal, the method comprising:
transforming an input signal into the frequency domain by applying an FFT processing to obtain a transformed input signal;
discarding a part of the transformed input signal;
separating positive and negative frequency components of a remaining transformed input signal;
separately processing respective ones of the separated positive and negative frequency components by respective digital filtering to obtain filtered frequency components, wherein the digital filtering comprise at least one of a chromatic dispersion (CD) filtering and a multiple-input multiple output (MIMO) filtering;
updating coefficients of the MIMO filter based on the result of multiplication of decimated conjugate output data of the CD filter by decimated error samples;
combining the filtered frequency components in the frequency domain using a down-sampling operation for down-sampling the filtered frequency components from an input number of samples per symbol to a different output number of samples per symbol; and
converting the combined output components into the time domain by applying an IFFT processing,
wherein the positive and negative frequency components are determined by the following positive and negative frequency components vectors;

$XFFTA(l)=XFFT(l)$ $XFFTB(l+1)=XFFT(N-1-l)$ wherein $l=0, \ldots, L$, and wherein L is determined as follows:

$L=(1+r)\cdot M/2,$ wherein r is the maximal roll-off factor of a Nyquist filter and M is the data size of the IFFT.

10. The method according to claim 9, wherein combining comprises decimating frequency samples.

11. The method according to claim 10, wherein decimating comprises:
performing poly-phase decimation with a dynamically selected decimation phase, and using different frequency domain samples at different FFT cycles.

12. A computer program product for processing a digital signal, the computer program product comprising a non-transitory computer readable storage medium having program code embodied therewith, the program code executable by a processor to:
transform an input signal into the frequency domain by applying an FFT processing to obtain a transformed input signal;
discard a part of the transformed input signal;
separate positive and negative frequency components of a remaining transformed input signal;
separately process respective ones of the separated positive and negative frequency components by respective digital filtering to obtain filtered frequency components, wherein the digital filtering comprise at least one of a chromatic dispersion (CD) filtering and a multiple-input multiple output (MIMO) filtering;
update coefficients of the MIMO filter based on the result of multiplication of decimated conjugate output data of the CD filter by decimated error samples;
combine the filtered frequency components in the frequency domain using a down-sampling operation for down-sampling said filtered frequency components from an input number of samples per symbol to a different output number of samples per symbol; and
convert the combined output components into the time domain by applying an IFFT processing,
wherein the positive and negative frequency components are determined by the following positive and negative frequency components vectors;

$XFFTA(l)=XFFT(l)$ $XFFTB(l+1)=XFFT(N-1-l)$ wherein $l=0, \ldots, L$, and wherein L is determined as follows:

$L=(1+r)\cdot M/2,$ wherein r is the maximal roll-off factor of a Nyquist filter and M is the data size of the IFFT.

13. The computer program product for processing a digital signal according to claim 12, wherein the program code to combine comprises program code executable by the processor to:
decimate frequency samples.

14. The computer program product for processing a digital signal according to claim 13, wherein the program code to decimate comprises program code executable by the processor to:
perform poly-phase decimation with a dynamically selected decimation phase, and use different frequency domain samples at different FFT cycles.

* * * * *